Aug. 2, 1960

L. J. HEINE 2,947,392

CONTROL SYSTEM FOR EXHAUST BRAKE

Filed Oct. 3, 1956

INVENTOR.
LAWRENCE JOSEPH HEINE

BY his ATTORNEYS.

INVENTOR.
LAWRENCE JOSEPH HEINE

United States Patent Office 2,947,392
Patented Aug. 2, 1960

2,947,392

CONTROL SYSTEM FOR EXHAUST BRAKE

Lawrence Joseph Heine, Bethlehem, Pa., assignor to Mack Trucks, Inc., New York, N.Y., a corporation of New York Filed Oct. 3, 1956, Ser. No. 613,647

7 Claims. (Cl. 192—3)

This invention relates to braking systems and it relates particularly to an exhaust brake system for vehicles utilizing internal combustion engines.

Exhaust brake systems have been known for many years and have been used heretofore with compression ignition engines of the diesel type in heavy duty vehicles such as trucks, buses and the like. An exhaust brake system includes a valve member, such as a butterfly valve, mounted in the exhaust pipe or adjacent to or in the exhaust manifold so that when it is moved to a closed position, the valve will prevent or restrict flow of exhaust gases and will cause a back pressure to be created in the exhaust manifold and engine cylinders. The action of the exhaust brake is similar to the action of the engine when operating on compression and augments the braking effect of the engine by about 50%.

Use of such exhaust braking systems is limited usually to compression ignition engines and is particularly useful with the type of engine having a fuel system in which the entire fuel supply is cut off during coasting or drifting of the vehicle. Those engines having a fuel supply controlled by an injector system in which a minimum amount of fuel is supplied to the engine can be also provided with an exhaust brake because the engine temperatures, while the engine is idling or the vehicle is coasting, are not sufficiently high to damage the valves of the engine.

The present invention relates to a control system for the valve of an exhaust brake whereby optimum and substantially automatic control of the exhaust brake is obtained for various conditions of operation.

In accordance with the present invention, the control system is constructed and arranged so that it can be controlled automatically by the fuel supply so that the brake is applied when the fuel supply to the engine is shunt off or when the foot brake of the vehicle is applied and the fuel supply is shut off by release of the accelerator. Moreover, the exhaust brake can be taken completely out of service when there is no demand for its use as, for example, when the vehicle is being driven in flat country.

Under certain conditions, for example when traveling on long down grades, it is desirable to have automatic control or application of the exhaust brake when the vehicle is coasting and the engine is used for compression braking. To satisfy this condition, the control system is provided with means to actuate a valve or other control member for supplying power to move the exhaust brake valve to its closed position whenever the accelerator is fully released.

Under other conditions as for example when coasting or drifting along level roads and braking is not desired, the system is constructed to permit the exhaust brake to be applied only when the fuel supply is cut off and the foot brake is applied. In either case, the exhaust brake is automatically moved to open position when fuel is supplied to the engine to prevent development of destructive back-pressures and temperatures in the cylinders.

For a better understanding of the present invention reference may be had to the accompanying drawings, in which.

Figure 1:
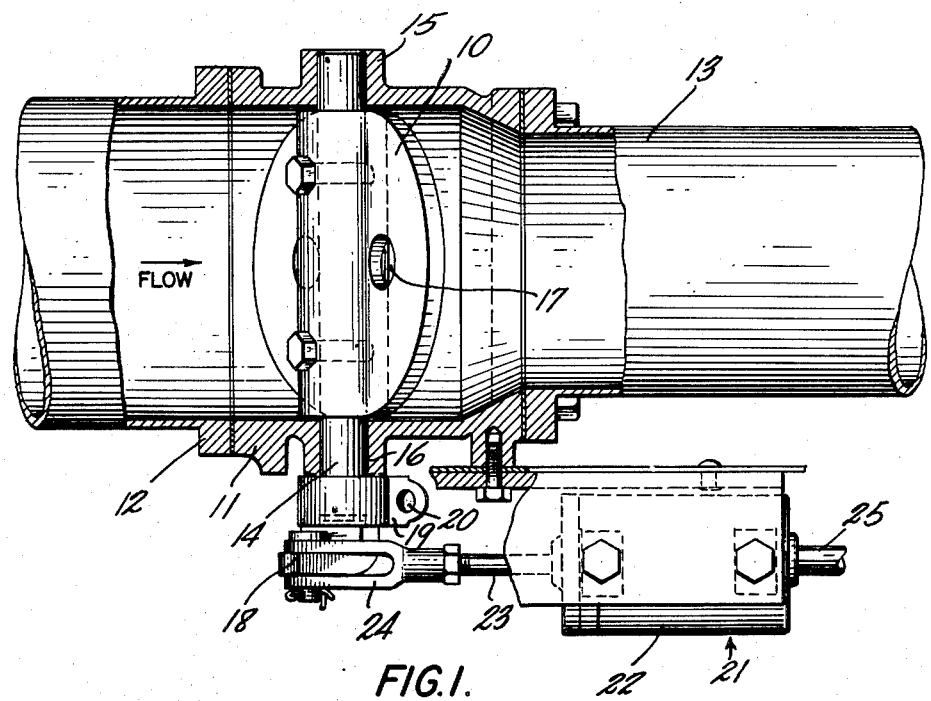
Figure 1 is a plan view of an exhaust pipe or manifold including the exhaust brake valve and operating motor therefor, a portion of the manifold being broken away to disclose the valve therein.
Figure 2:
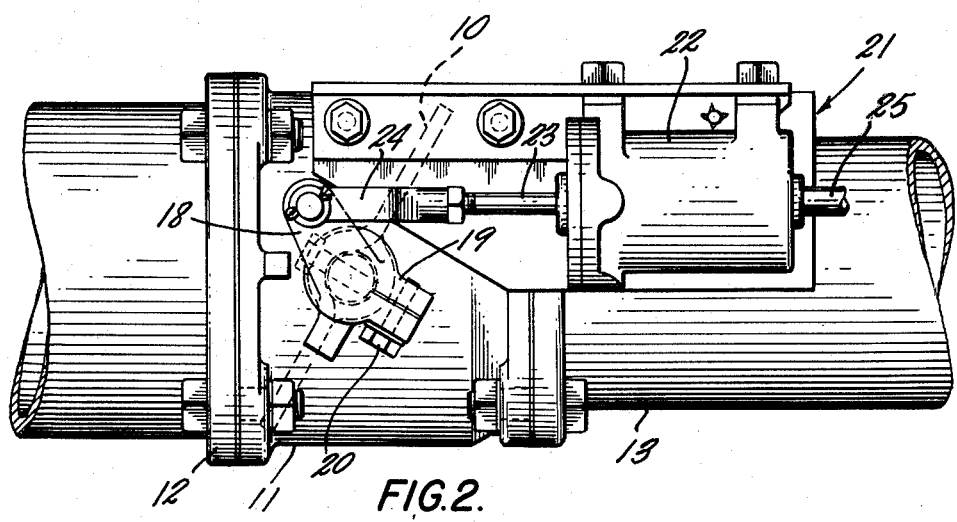
Figure 2 is a view in side elevation of the exhaust manifold and the actuating motor for the brake valve.

A typical form of exhaust brake valve and actuating motor for the same is disclosed in Figures 1 and 2 of the drawings. In this embodiment, a butterfly valve 10 is mounted in the exhaust pipe of the engine, for example, in a coupling 11 which is mounted between the down stream end of the manifold 12 and the pipe 13 leading to the muffler. The manifold, coupling and exhaust pipe are included in the term "exhaust pipe," and they may form a unitary or multiple part assembly. A shaft 14 is rotatably supported in bushings 15 and 16 carried by the coupling 11 and supports the valve 10. If desired, the butterfly valve 10 may have small ports 17 therein to permit restricted flow of exhaust gas therethrough, particularly if it is used with an engine E of the type in which a very small amount of fuel is admitted by the fuel injection system to the cylinders during idling or coasting.

At the one end of the shaft 14 is secured a lever 18 mounted on a split collar 19 which is clamped to the end of the shaft by means of a screw 20 passing through the opposite ends of the collar.

Movement of the valve between a position substantially closing the exhaust pipe and thereby restricting flow of gases therethrough and a position in which the valve is generally parallel to the direction of flow of the gases is produced by means of a motor 21 which, as illustrated, is a cylinder 22 having a piston therein (not shown) provided with a connecting rod 23 that is connected by means of an adjustable clevis 24 to the lever 18. Operating fluid, for example compressed air, is admitted through the air inlet pipe 25 to the right-hand end of the cylinder to rotate the lever 18 and valve 10 counter-clockwise to closed position. A spring (not shown) is interposed between the piston and the left-hand end of the cylinder to urge the valve normally in a clockwise direction to open position.

Inasmuch as the exhaust gases may have a high temperature, and the valve 10 is in the path of flow of the gases, it is advisable to form the valve of a heat and corrosion resistant metal such as the nickel-chrome alloy known as "Nichrome."

It may also be advisable to use a remote control mechanism for the valve to avoid leakage in the system. Thus, the shaft 14 may be mounted in bushings which are closed at their outer ends and the valve may be operated by means of a linkage including an operating lever disposed downstream of the valve. In this way, any leakage occurring around the bushings of the operating lever will occur downstream of the exhaust brake valve and will have no effect on the braking action of the valve.

Figure 3:
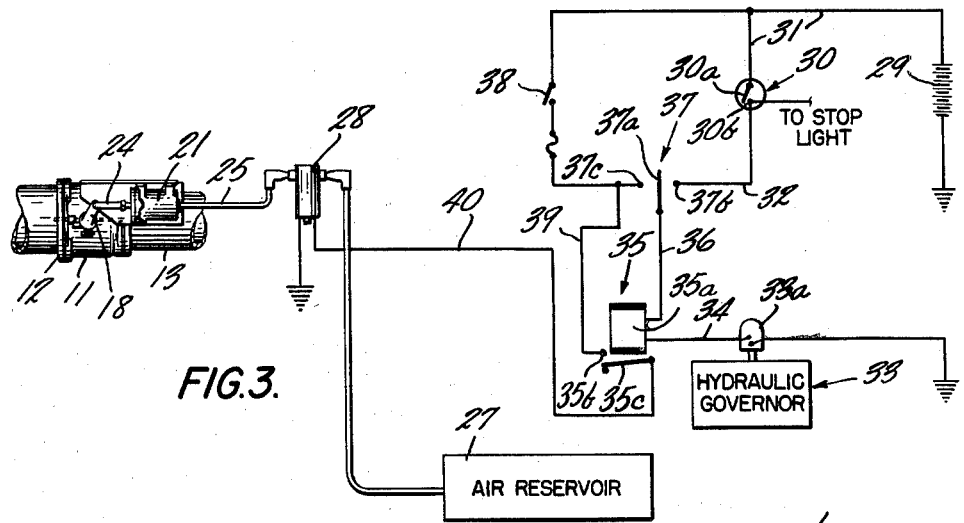
Figure 3 is a schematic wiring diagram illustrating the electrical circuit for controlling the exhaust brake.

The novel feature of the present invention is the control system for the exhaust brake. As shown in Figure 3, a normally closed solenoid valve 28 is interposed between the cylinder 21 and the air reservoir 27. When the valve 28 is opened electrically, air is admitted to the cylinder 21 and the valve 10 is moved to closed position.

Figure 5:
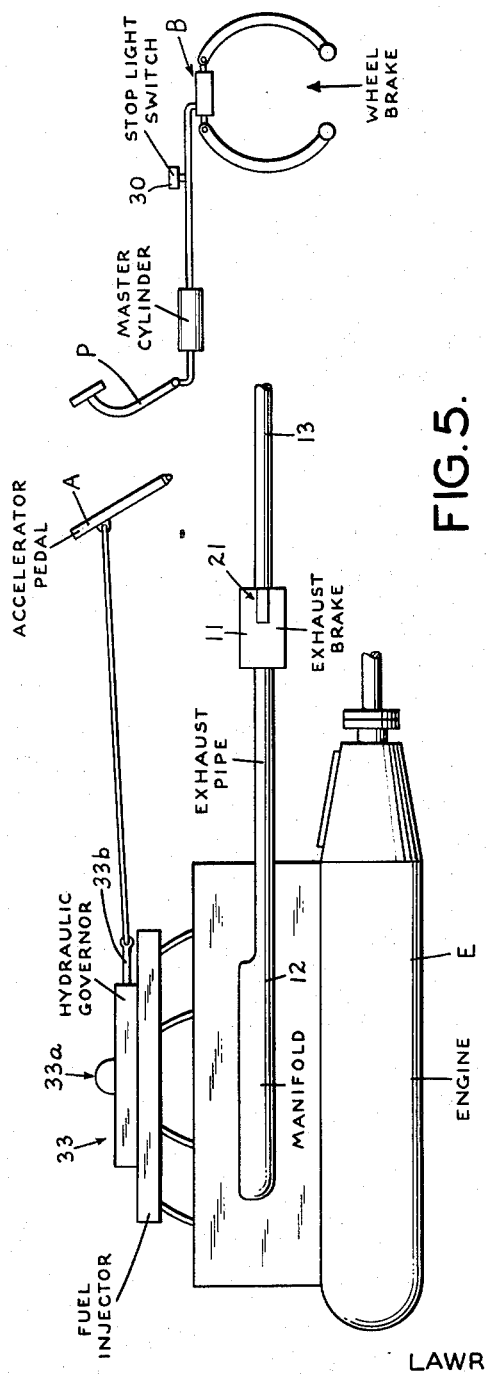
Figure 5 is a diagrammatic illustration of the cooperating elements of a braking system embodying the invention.

In order to afford a maximum flexibility of operation of the exhaust brake, an interlocking control system for the valve 28 is provided. As shown, the solenoid valve 28 is supplied by electrical energy from the vehicle battery 29, for example, which has one terminal grounded on the frame of the vehicle in the usual way and the other terminal connected to the stop light switch 30 of the vehicle which is under the control of the foot brake pedal P (Fig. 5). The stop light switch 30 is normally open but when the brake B is applied, the contacts 30a and 30b are engaged. The contact 30a is connected by means of the line 31 to one terminal of the battery 29 and the contact 30b is connected to a line 32.

Inasmuch as it is undesirable to apply the exhaust brake when fuel is being supplied to the engine E, the new control system includes means for preventing application of the exhaust brake except when the fuel supply to the engine is shut off. To that end, the system makes use of the hydraulic governor 33 of the fuel injection system of the vehicle and which includes a control rack 33b (Fig. 5) that is moved by means of an accelerator pedal A to a projected position to supply fuel to the engine E and to retracted position to shut off the supply of fuel. A normally open switch 33a in the governor is closed by movement of the rack to its retracted position. A line 34 (Fig. 3) connects one contact of the switch 33a to the coil 35a of a relay 35, the other side of the coil being connected by means of a line 36 to the movable contact 37a of a three position switch 37. Another contact 37b of the switch 37 is connected to the line 32. The circuit enables the stop light switch 30, the coil 35a and the control switch 33a of the hydraulic governor to be connected in series with the battery 29 when the contacts 37a and 37b are closed.

Line 31 is connected through the vehicle main switch 38 to contact 37c of the three position switch 37 and is also connected by line 39 to the contact 35b of the relay 35. The movable contact 35c of the relay is connected by means of a line 40 to one terminal of the solenoid valve 28, the opposite terminal of which is grounded.

With the switches in the position shown in Figure 3, it will be evident that there is an open circuit through the solenoid valve 28, the valve 28 is closed and the exhaust brake valve 10 is in an open position.

When the main switch 38 is closed and the switch 37 is in the position shown, it is possible to operate the vehicle but impossible to operate the exhaust brake.

When the switch contact 37a is brought into engagement with the switch contact 37b, the circuit through the relay coil is open unless the foot brake pedal P is operated to close the switch 30 and the accelerator pedal A is released to shut off the supply of fuel to the engine E. Under those conditions, the switches 30 and 33a are closed and a circuit is completed between ground, the battery 29, the conductor 31, now closed switch 30, closed switch contacts 37a, 37b, conductor 36, relay coil 35a, conductor 34, switch 33a and ground. Thereby the relay coil is energized and the relay contacts 35b and 35c engage completing a circuit from ground, battery 29, line 31, switch 38, line 39, contacts 35b, 35c, line 40, solenoid valve 28, to ground. The valve 28 is now opened and air is admitted into the cylinder 21 to move the exhaust brake valve 10 to closed position. It is apparent that with the above described circuit, the vehicle can coast or drift without actuation of the exhaust valve unless the foot brake switch 30 is closed by application of the foot brake pedal P. The exhaust brake will normally be in this condition when the vehicle is operated on relatively long stretches of road where there are no hills of sufficient size to require braking of the engine by compression and by the exhaust brake.

In mountainous areas, it may be desirable to use the exhaust brake independently of the foot brake. In these circumstances, the switch 37 is moved to bring the contacts 37a and 37c into engagement thereby bypassing stop light switch 30. Operation of the exhaust brake then is dependent entirely upon whether or not fuel is being supplied to the engine E. Thus, when the accelerator pedal A is released and the fuel supply ceases, the valve 33a will move from its normally open position to its normally closed position and the circuit will be produced as follows: ground, battery 29, line 31, switch 38, contacts 37c and 37a, line 36 relay coil 35a, line 34, and closed switch 33a to ground. Energization of the coil 35 closes the contacts 35b, 35c so that the solenoid valve 28 is energized and air is supplied to the motor 21 to close the exhaust brake valve. Actuation of the foot brake B is completely independent of the exhaust brake and vice versa, with the system in this condition.

The above described system enables three conditions of operation to be satisfied, namely (1) a condition in which the exhaust brake is maintained completely out of service for ordinary driving conditions, (2) a condition in which automatic braking is controlled by the supply of fuel to the engine, and (3) a condition in which the exhaust brake is applied only when the foot brake in applied and the supply of fuel to the engine is shut off by release of the accelerator. Under all of these conditions, the exhaust brake cannot remain closed or be closed while fuel is being supplied to the engine thereby avoiding burning of the engine valves by restriction of the flow of exhaust gases.

Figure 4:
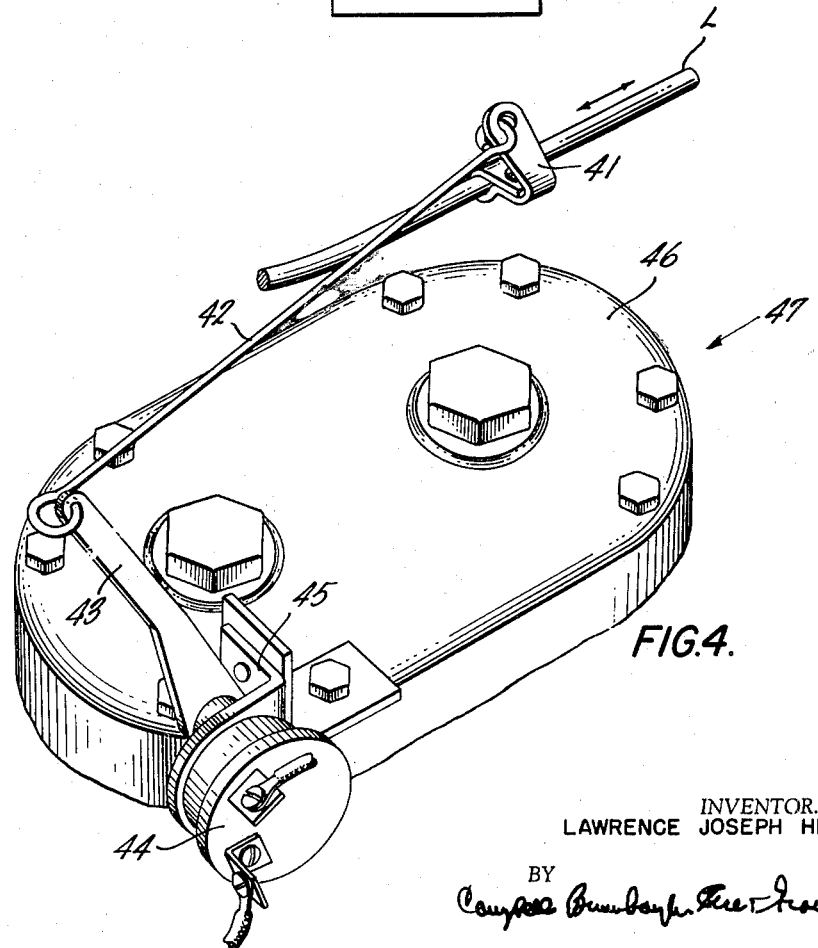
Figure 4 is a perspective view of a modified form of control mechanism for controlling the operation of the exhaust brake by means of the accelerator linkage of the vehicle.

It will be understood that there are many different ways in which the switches such as the switches 33a and 30 can be connected in the circuit and actuated under the control of the accelerator and brake pedals. For example, the switch controlled by the brake pedal may be connected directly to the pedal linkage and may be completely independent of the stop light switch. By the same token, instead of using the hydraulic governor of the fuel injection system to control the exhaust brake, a separate switch may be operated directly off of the accelerator linkage. The switch and connection shown in Figure 4 may be used with the foot brake or the accelerator. As shown, a link L connected to accelerator pedal (not shown) is provided with a bracket 41 connected by means of a link 42 to a lever arm 43 of a rotary contact switch 44. The switch 44 is normally open when the accelerator is depressed to any degree but closes when the accelerator is released. The switch 44 is substituted for the switch 33a shown in Figure 3. A similar type of switch actuated by the foot brake pedal may replace the stop light switch 30 in the exhaust brake circuit. As shown in Figure 4, the switch 44 is mounted on a suitable bracket assembly 45 secured to the cylinder head 46 of an air compressor 47 or to any other conveniently located part of the vehicle frame or chassis, or body.

The above described system is essentially foolproof in operation and gives a high degree of flexibility in use for all conditions of operation. It is under the complete control of the operator who can use it as a fully automatic system in which the switch 33a applies the brakes every time the fuel supply is cut off to the engine or as a coordinated control whereby the application of the exhaust brake is dependent upon the application of the foot brake and release of the accelerator pedal of the vehicle.

From the foregoing description it will be understood that the control system for the exhaust brake is susceptible to the considerable modification and, therefore, the embodiment of the invention described herein should be considered as illustrative.

I claim:

1. A brake system for a vehicle having a compression ignition engine, an exhaust pipe extending from said engine, a movable foot brake member for the wheel brakes of the vehicle, means for supplying fuel to said engine and a movable accelerator pedal for controlling the supply of fuel to said engine and substantially shutting off the supply when released, comprising a valve in said exhaust pipe movable to substantially close said pipe and obstruct flow of exhaust gases from said engine and create a back pressure in said exhaust pipe, a motor connected to said valve for moving it to close said pipe, means normally urging said valve to open said pipe, first control means connected to said foot brake member and movable in response to actuation of said foot brake member, second control means responsive to movement of said accelerator pedal to a position substantially shutting off the supply of fuel, means connected to said first and second control means and responsive to release of said accelerator pedal and movement of said brake pedal when said accelerator pedal is released at any engine speed for actuating said motor to move said valve in and close said exhaust pipe, and manually operable means for selectively rendering said first control means ineffective and said second control means effective, said manually operable means being adjustable to render both of said first and second control means ineffective to actuate said motor.

2. The brake system set forth in claim 1 in which said motor is a fluid-actuated motor and each of said first and second control means comprises an electrically controlled valve for admitting fluid under pressure to said motor and a switch for energizing and deenergizing said electrically controlled valve.

3. A brake system for vehicles having a compression ignition engine, an exhaust pipe extending from the engine, comprising a valve mounted in said exhaust pipe and movable between one position obstructing flow of exhaust gas from said engine through said pipe and another position allowing flow of said gas through said pipe, power means connected to said valve for moving it to said positions, means for supplying power to said power means, a foot brake for said vehicle, first control means responsive to operation of said foot brake, second control means responsive to supply of fuel to said engine, a control member connected between said power means and said power supply means for connecting and disconnecting them, and a third control means for (1) connecting said first and second control means to said control member, (2) disconnecting said first and second control means from said control member and (3) connecting said second control means only to said control member, said control member being responsive to said first and second control means, when connected with them, for actuating said power means to move said valve to said one position upon movement of said accelerator pedal and said brake pedal to positions interrupting the supply of fuel to said engine and applying said brakes, respectively.

4. A brake system for a vehicle having a compression ignition engine, an exhaust pipe leading from said engine to discharge exhaust gases therefrom, a movable foot brake member for actuating wheel brakes for the vehicle and a movable accelerator member for controlling the supply of fuel to said engine, comprising a valve mounted in said exhaust pipe and movable to substantially open and close said pipe, a fluid motor for moving said valve, a source of fluid pressure, means connecting said source to said motor, an electrically actuated valve interposed in said means between said source and said motor for connecting and disconnecting them to energize and deenergize said motor, respectively, a source of electrical energy for actuating the electrically actuated valve, a first normally open switch movable to closed position by actuation of said foot brake to apply said wheel brakes, and a second normally open switch closed by movement of said accelerator to a position substantially shutting off fuel to said engine, means electrically connecting said source of electrical energy, said switches and said electrically actuated valve for opening and closing said electrically actuated valve in response to opening and closing of said switches and a third switch electrically connected with said first and second switches for connecting and disconnecting them with said source to render said electrically actuated valve selectively responsive to closing of said second switch and closing of said first and second switches.

5. The brake system set forth in claim 4 in which said third switch comprises a manually operated multiple contact switch connected between said source and said electrically actuated valve and movable to an open position interrupting the electrical connection said source and said electrically actuated valve, said manually operated switch being movable to one closed position connecting said first and second switches in said electrical connections with said source and said electrically actuated valve and said manually operated switch being movable to another closed position in which said first switch is rendered ineffective and the second switch is connected in the electrical connection with said source and said electrically actuated valve.

6. A brake system for vehicles having a compression ignition engine, an exhaust pipe for said engine, a foot brake member for applying the wheel brakes of the vehicle and an accelerator member, fuel flow control means actuated by said accelerator member for supplying and shutting off the supply of fuel to the engine, comprising a valve mounted in said exhaust pipe, a motor connected to said valve for moving it to open and closed positions, electrically controlled means for energizing said motor to close said valve and deenergizing said motor to open said valve, a first switch connected to said foot brake member and actuated upon application of said wheel brakes by said foot brake member, a second switch actuated by said accelerator member when the fuel flow control means actuated thereby substantially shuts off supply of fuel to said engine, and manual control means for connecting said first switch and said second switch to said electrical control means to actuate said motor in response to actuation of both of said first and second switches, said manual control means being adjustable to disconnect said first switch from said electrical control means to render said motor responsive to said second switch, only.

7. The brake system set forth in claim 6 in which said manual control means is adjustable to disconnect both of said first and second switches from said electrical control means to render them ineffective to energize said motor.

References Cited in the file of this patent
UNITED STATES PATENTS

| | | |
|---|---|---|
| 1,890,790 | Messinger | Dec. 13, 1932 |
| 2,168,232 | Messinger | Aug. 1, 1939 |